(12) United States Patent
Zhang (10) Patent No.: US 12,536,231 B2
(45) Date of Patent: Jan. 27, 2026

(54) METHOD FOR CONSTRUCTING KNOWLEDGE GRAPH AND METHOD FOR DIAGNOSING VEHICLE FAULTS

(71) Applicant: CAROTA Technology Corporation, Shanghai (CN)

(72) Inventor: Xinjie Zhang, Shanghai (CN)

(73) Assignee: CAROTA Technology Corporation, Shanghai (CN)

( * ) Notice: Subject to any disclaimer, the term of this patent is extended or adjusted under 35 U.S.C. 154(b) by 0 days.

(21) Appl. No.: 18/960,480

(22) Filed: Nov. 26, 2024

(65) Prior Publication Data

US 2025/0086232 A1     Mar. 13, 2025

(30) Foreign Application Priority Data

Nov. 14, 2024    (CN) .......................... 202411629975.0

(51) Int. Cl.
     *G06F 16/00*          (2019.01)
     *G06F 16/901*         (2019.01)
     *G07C 5/00*           (2006.01)
     *G07C 5/08*           (2006.01)

(52) U.S. Cl.
     CPC ......... *G06F 16/9024* (2019.01); *G07C 5/008* (2013.01); *G07C 5/0808* (2013.01); *G07C 5/0825* (2013.01)

(58) Field of Classification Search
CPC ..... G06F 16/00; G06F 16/9024; G06F 16/901
See application file for complete search history.

(56) References Cited

U.S. PATENT DOCUMENTS

| | | | |
|---|---|---|---|
| 2022/0194400 A1 * | 6/2022 | Gee | ........................ G06V 10/82 |
| 2023/0288490 A1 | 9/2023 | Du et al. | |
| 2024/0004747 A1 | 1/2024 | Nishino et al. | |
| 2024/0370008 A1 | 11/2024 | Mahringer | |

FOREIGN PATENT DOCUMENTS

CN            116129551 A       5/2023

OTHER PUBLICATIONS

Souissi et al., "Fault Diagnosis Based On Database-Driven Techniques: Application To The Electric Vehicle Case," IEEE, 2024, pp. 1-6. (Year: 2024).*

* cited by examiner

*Primary Examiner* — Cheryl Lewis (57) ABSTRACT

The disclosure provides a method for constructing a knowledge graph for vehicle fault diagnosis. The method can comprise creating a database of vehicle components; creating a database of abnormal signals; creating a fault knowledge triple from existing unstructured fault diagnostic data and semi-structured fault diagnostic data; and associating the abnormal signal, the vehicle component and the repair suggestion based on the fault knowledge triples to construct the knowledge graph for vehicle fault diagnosis.

9 Claims, 5 Drawing Sheets

METHOD FOR CONSTRUCTING KNOWLEDGE GRAPH AND METHOD FOR DIAGNOSING VEHICLE FAULTS

CROSS-REFERENCE TO RELATED APPLICATIONS

This application claims priority to Chinese patent application No. 202411629975.0, filed on Nov. 14, 2024, the contents of which are incorporated herein by reference.

TECHNICAL FIELD

This disclosure relates generally to automated fault diagnosis for vehicles, particularly to methods of constructing a knowledge graph for vehicle fault diagnosis and methods and systems of diagnosing vehicle faults based on a knowledge graph.

BACKGROUND

The method for diagnosing vehicle faults using knowledge graph is a methodology that employs big data and artificial intelligence technology to construct a knowledge graph through the analysis of analyzing repair history data. The knowledge graph is then utilized to automatically identify, classify and recommend repair actions for vehicle faults, thereby enhancing repair efficiency and accuracy.

The method for diagnosing vehicle faults using knowledge graph first extracts valuable information from a vast repository of repair data through entity extraction and relationship recognition technology, and subsequently organizes this information into a knowledge graph. Based on this methodology, the system is able to diagnose vehicle faults, determine the possible faulty components, and provide repair guidance for the faulty components the use of sophisticated algorithmic models, such as the XGBoost fault classification model.

SUMMARY

A first aspect of the disclosure provides a method for constructing a knowledge graph for vehicle fault diagnosis. The method can comprise creating a database of vehicle components, the vehicle components comprising fundamental units that can be replaced or repaired; creating a database of abnormal signals, the abnormal signals comprising vehicle information related to vehicle faults, the vehicle information related to vehicle faults comprising a vehicle operation mode, a vehicle state, a sensor signal and a driving data; creating a fault knowledge triple from existing unstructured fault diagnostic data and semi-structured fault diagnostic data, the fault knowledge triple comprising <abnormal signal-fault name-faulty component> and <faulty component-repair method-repair suggestion>; and associating the abnormal signal, the vehicle component and the repair suggestion based on the fault knowledge triples to construct the knowledge graph for vehicle fault diagnosis. In some instances, a probability $P_{i/k}$ that an abnormal signal i indicates that a vehicle component k is faulty can be used as a weight $E_{i/k}$ for an edge between a node corresponding to the abnormal signal i and a node corresponding to the vehicle component k in the knowledge graph.

In some embodiments, the knowledge graph can comprise an abnormal signal node, a faulty component node and a repair suggestion node. The abnormal signal node can be associated with one or more faulty component nodes that are related to a generation of the abnormal signal. The faulty component node can be associated with one or more repair suggestion nodes that provide repair suggestions for the faulty component node.

In some embodiments, the probability $P_{i/k}$ can be calculated using Formula I:

$$P_{i/k} = C(i,k)/C(i) \qquad \text{Formula I}$$

where C(i, k) is the number of times the abnormal signal i and the vehicle component k occur simultaneously in a same fault, and C(i) is the number of times the abnormal signal i occurs in all faults.

In some embodiments, the method for constructing a knowledge graph for vehicle fault diagnosis can further comprise updating the weight $E_{i/k}$ using new data through a machine learning algorithm.

In some embodiments, the method for constructing a knowledge graph for vehicle fault diagnosis can further comprise summing a plurality of probabilities, each corresponding to a respective one of a plurality of abnormal signals associated with the vehicle component k, to obtain a probability of fault for the vehicle component.

In some embodiments, the method for constructing a knowledge graph for vehicle fault diagnosis can further comprise training a machine learning model using the fault knowledge triple, thereby enabling the machine learning to predict future faults and recommend repair measures.

In some embodiments, the method for constructing a knowledge graph for vehicle fault diagnosis can further comprise recognizing an association between a plurality of the fault knowledge triples, thereby interlinking the plurality of the fault knowledge triples.

A second aspect of the disclosure provides a method for diagnosing vehicle faults using a knowledge graph. The method can comprise generating a fault snapshot image when a fault monitoring module of a vehicle terminal detects a vehicle fault; transmitting the fault snapshot image from the vehicle terminal to a cloud server; parsing a vehicle information at the cloud server from the fault snapshot image, and performing a fault diagnosis in a fault knowledge graph stored at the cloud server based on the vehicle information to determine a target repair suggestion node; and transmitting from the cloud server an information of the target repair suggestion node as a diagnostic information to the vehicle terminal. The fault knowledge graph can comprise abnormal signal nodes, faulty component nodes and repair suggestion nodes, the abnormal signal nodes each being associated with one or more faulty component nodes that are related to a generation of the vehicle fault, the faulty component nodes each being associated with one or more repair suggestion nodes that provide repair suggestions for the faulty component node. In some embodiments, determining the target repair suggestion node can comprise determining a faulty component node having the highest probability of fault from among a plurality of the faulty component nodes as a target faulty component node and determining a repair suggestion node associated with the target faulty component node as the target repair suggestion node.

In some embodiments, the probability of fault $P_k$ of each faulty component node can be calculated by Formula II:

$$P_k = \sum_i P_{i/k} \qquad \text{Formula II}$$

where $P_{i/k}=C(i, k)/C(i)$, $C(i, k)$ being the number of times the abnormal signal i and the vehicle component k occur simultaneously in a same fault, and $C(i)$ being the number of times the abnormal signal i occurs in all faults.

A third aspect of the disclosure provides a system for diagnosing vehicle faults using a knowledge graph. The system can comprise a vehicle terminal and a cloud server. The vehicle terminal can comprise a fault monitoring module configured to generate a fault snapshot image in the event of a vehicle fault; and a fault transmitting module configured to transmit the fault snapshot image to the cloud server. The cloud server can comprise a fault knowledge graph; a fault snapshot receiving module; and a fault diagnosis module. The fault knowledge graph can comprise abnormal signal nodes, faulty component nodes and repair suggestion nodes, the abnormal signal nodes being each associated with one or more faulty component nodes that generate the abnormal signal, the faulty component nodes being each associated with one or more repair suggestion nodes that provide repair suggestions for the faulty component node. The fault snapshot receiving module can be configured to receive the fault snapshot image from the vehicle terminal. The fault diagnosis module can be configured to parse a vehicle information from the fault snapshot image, perform a fault diagnosis in the fault knowledge graph based on the vehicle information to obtain a target repair suggestion node, and transmit an information of the target repair suggestion node as a diagnostic information to the vehicle terminal. In some embodiments, determining the target repair suggestion node can comprise determining a faulty component node having the highest probability of fault from among a plurality of the faulty component nodes as a target faulty component node and determining a repair suggestion node associated with the target faulty component node as the target repair suggestion node.

In some embodiments, the probability of fault $P_k$ of each faulty component node can be calculated by Formula II:

$$P_k = \sum_i P_{i/k} \quad \text{Formula II}$$

where $P_{i/k}=C(i, k)/C(i)$, $C(i, k)$ being the number of times the abnormal signal i and the vehicle component k occur simultaneously in a same fault, $C(i)$ being the number of times the abnormal signal i occurs in all faults.

A fourth aspect of the disclosure provides a system comprising one or more computer processors and a computer-readable memory. The computer readable memory can comprise machine executable code that, upon execution by the one or more computer processors, implements a method for constructing a knowledge graph for vehicle fault diagnosis or a method for diagnosing vehicle faults using a knowledge graph of the disclosure.

It should be understood that this disclosure does not intend to identify the key or important features of the embodiments of this disclosure, nor is it intended to limit the scope of this disclosure. Other features of this disclosure will become easily understood through the following description.

BRIEF DESCRIPTION OF THE DRAWINGS

The novel features of the disclosure are set forth with particularity in the appended claims. A better understanding of the features and advantages of this disclosure will be obtained by reference to the following detailed description that sets forth illustrative embodiments, in which the principles of the disclosure are utilized, and the accompanying drawings.

DETAILED DESCRIPTION

Traditional methods for vehicle fault troubleshooting depend on standard fault codes generated by the vehicle computer (ECU) following a fault. Technicians can determine the cause of the fault and fix it by analyzing the fault codes and related log data. The restricted range of failures that fault code-dependent diagnostic approaches cover, however, limits their applicability.

Current fault diagnostic approaches face several challenges: first, these approaches rely excessively on the personal experience of repair personnel, which varies in level; second, analyzing the cause of the fault is often time-consuming and costly; and finally, the experience of vehicle repair personnels is not effectively consolidated and accumulated for recurring faults, resulting in an inability to fully utilize the repair knowledge and solutions currently available.

In view of the above problems in the prior art, this disclosure proposes a new method for constructing a knowledge graph for vehicle fault diagnosis and a new method for diagnosing vehicle faults using the knowledge graph.

The knowledge graph constructed in this disclosure can provide detailed information about the faulty vehicle components and the repair methods thereof. This enables the knowledge graph-based vehicle fault diagnosis methods to accurately locate the faulty components and facilitate the repair personnel's ability to quickly perform repairs.

Figure 1:
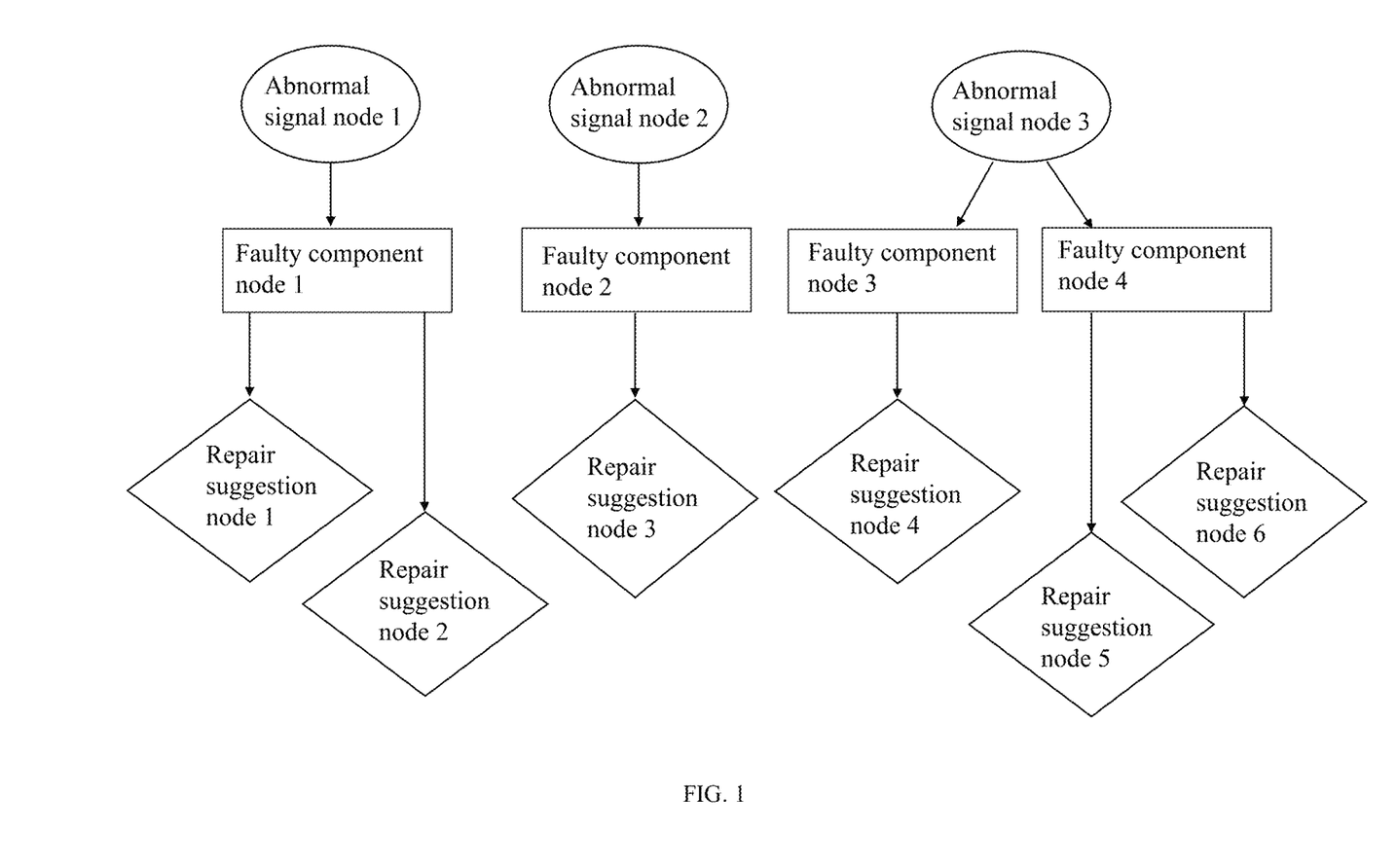
FIG. 1 shows a structure of an exemplary knowledge graph for vehicle fault diagnosis according to an embodiment of this disclosure.

As shown in FIG. 1, this disclosure provides a knowledge graph for vehicle fault diagnosis. The knowledge graph constructs a semantic association network. In some instances, the knowledge graph of this disclosure is a graph-based data structure, including nodes (Points) and edges (Edges) connecting the nodes. In some instances, the knowledge graph of this disclosure can integrate multiple types of nodes, such as abnormal signal nodes, faulty component nodes, and repair suggestion nodes, thereby providing a comprehensive framework of information for vehicle fault diagnosis and repair. In some instances, the abnormal signal node represents an abnormal signal appearing in the vehicle system indicative of a problem or fault (for example, a signal indicating a low battery charge). The faulty component node represents one or more vehicle components (for example, a battery) that may cause the abnormal signal node. The repair suggestion node provides one or more suggestions for addressing the faulty component (for example, checking the connection or charge of the battery).

In some instances, the abnormal signal node can be associated with one or more faulty component nodes that may generate the abnormal signal. The association can be represented by an edge between the abnormal signal node and the faulty component node(s). The faulty component node can be associated with one or more repair suggestion nodes that provide recommended repair measures for the faulty component. The association can be represented by an edge between the faulty component node and the repair suggestion node(s). In some instances, a value of the edge between the faulty component node and the repair suggestion node can be 1. In some instances, the value of the edge between the faulty component node and the repair suggestion node can be a statistically obtained probability value for the association.

In a non-limiting example, for the fault "engine failing to start", the knowledge graph of this disclosure can comprise (i) abnormal signal nodes, including a "battery low power abnormal signal node", a "faulty fuel system abnormal signal node" and a "faulty ignition system abnormal signal node"; (ii) faulty component nodes, including a "battery node", a "fuel pump node", an "injector node", a "fuel filter node", a "spark plug node" and an "ignition coil node"; and (iii) repair suggestion nodes, including a "battery repair suggestion node", a "fuel pump repair suggestion node", a "injector repair suggestion node", a "fuel filter repair suggestion node", a "spark plug repair suggestion node" and an "ignition coil repair suggestion node". The repair suggestion nodes respectively comprise inspection/repair suggestions, such as textual descriptions, audio and/or video tutorials, for the battery, fuel pump, injector, fuel filter, spark plug and ignition coil. One abnormal signal node can be associated with one or more faulty component nodes. For example, a "battery low power abnormal signal node" can be associated with a "battery node". For example, a "faulty fuel system abnormal signal node" can be associated with three faulty component nodes: a "fuel pump node", a "fuel injector node" and a "fuel filter node".

In another non-limiting example, for the fault "engine temperature is too high", the knowledge graph of this disclosure can comprise (i) abnormal signal nodes associated with the fault "engine temperature is too high", including a "temperature sensor abnormal signal node" and a "cooling system abnormal signal node"; (ii) faulty component nodes associated with the "temperature sensor abnormal signal node" and the "cooling system abnormal signal node", including a "temperature sensor node", a "water pump node", a "radiator node" and a "coolant tank node"; and (iii) repair suggestion nodes associated with the faulty component nodes, including a "temperature sensor repair suggestion node", a "water pump repair suggestion node", a "radiator repair suggestion node" and a "coolant tank repair suggestion node". The repair suggestion nodes respectively comprise inspection/repair suggestions, such as textual descriptions, audio and/or video tutorials, for the temperature sensor, water pump, radiator and coolant tank.

A particular vehicle fault can be associated with a plurality of abnormal signal nodes, which can occur simultaneously or interact with each other. In some instances, in the knowledge graph of this disclosure, the plurality of abnormal signal nodes associated with the same vehicle fault can be associated with each other. Such association can be represented by edges between the plurality of abnormal signal nodes. In a non-limiting example, a plurality of abnormal signal nodes can cause the fault "brake system failure" such as "brake pad wear abnormal signal node", "brake fluid volume abnormal signal node", "brake fluid line clogging abnormal signal node" and "brake fluid cleanliness abnormal signal node". These abnormal signal nodes can be associated with each other, affect each other or occur simultaneously. For example, a brake pad wear can reduce a braking force, while a brake fluid contamination can further affect the braking effectiveness. A brake fluid leakage can result in the brake fluid not being properly delivered to the brake devices, while a brake line clogging can prevent the brake fluid from flowing. In another non-limiting example, for the fault "engine failing to start", there can be a plurality of abnormal signal nodes that are associated with each other, affect each other or appear at the same time, such as "low battery power abnormal signal node", "faulty fuel system abnormal signal node" and "faulty ignition system abnormal signal node".

A value can be assigned to the line (edge) between abnormal signal nodes. In some instances, a value can be assigned to the line (edge) between two abnormal signal nodes based on a probability of the two abnormal signals occurring at the same time. For example, if the probability that a faulty fuel system and a faulty ignition system occur at the same time being 0.4 according to a priori statistics, a value of 0.4 can be assigned to the line (edge) between the "faulty fuel system abnormal signal node" and the "faulty ignition system abnormal signal node".

Figure 2:
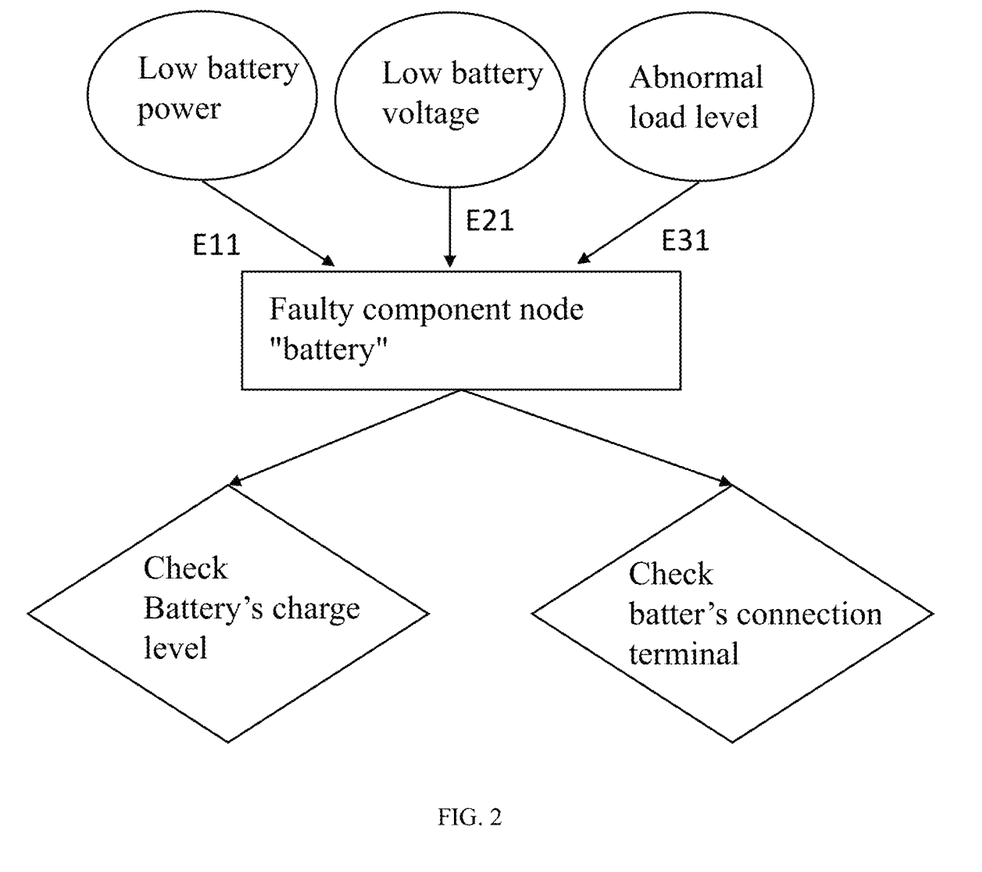
FIG. 2 shows a structure of another exemplary knowledge graph for vehicle fault diagnosis according to an embodiment of this disclosure.

FIG. 2 shows a structure of another exemplary knowledge graph for vehicle fault diagnosis according to an embodiment of this disclosure. In the case of a fault "insufficient battery power", the knowledge graph shown in FIG. 2 can comprise: three abnormal signal nodes "low battery power", "low battery voltage" and "abnormal load level"; a faulty component node "battery" that is associated with the three abnormal signal nodes; and a repair suggestion node that provides one or more repair suggestions for repairing the faulty component "battery" (for example, checking a connection or a charge level of the battery). In the exemplary embodiment, an association relationship between the three abnormal signal nodes and the faulty component node "battery" can be represented by edges E11, E21 and E31, respectively. Furthermore, the association relationship between the faulty component node "battery" and the associated repair suggestion node can be represented by an edge.

In some embodiments, in the knowledge graph of this disclosure, an edge between an abnormal signal node and an associated faulty component node, as well as an edge between a faulty component node and an associated repair suggestion node, can be assigned a value. Such value assignment can indicate a strength, importance or confidence of the relationship between the nodes. The assignment of values to the edges between the nodes in the knowledge graph can facilitate the vehicle fault diagnosis system's ability to process complex information. For example, the vehicle fault diagnosis system can more accurately determine a degree of association between an abnormal signal node and a faulty component node, as well as a correlation between a faulty component node and a repair suggestion node through the assignment of values. Such value assignment can be based on historical data, expert knowledge or real-time feedback to ensure the accuracy and reliability of the value assignment.

In some embodiments, an edge between a faulty component node and an associated repair suggestion node can be assigned a value of 1. In some embodiments, a plurality of edges between a faulty component node and a plurality of associated repair suggestion nodes can be assigned a value, respectively, based on a probability value obtained from previous statistics. In some embodiments, a plurality of edges between a faulty component node and a plurality of associated repair suggestion nodes can each be assigned a value based on a quality of the repair suggestion.

In some embodiments, a probability $P_{i/k}$ that the abnormal signal i indicating the vehicle component k is faulty can be used as a weight $E_{i/k}$ for the edge between the abnormal signal node corresponding to the abnormal signal i and the faulty component node corresponding to the vehicle component k in the knowledge graph. In an example, if it is established based on the statistical analysis of historical data that, a probability of an abnormal battery power signal occurring in the event of a battery failure is 50%, a probability of an abnormal battery voltage signal occurring in the event of a battery failure is 10%, and a probability of an abnormal vehicle load level occurring in the event of a battery failure is 26%, then the edge E11 can be assigned a value of 0.5, the edge E21 can be assigned a value of 0.1, and the edge E31 can be assigned a value of 0.26.

In the knowledge graph of this disclosure, which incorporates the value assignments, the probability of an association between an abnormal signal and a fault of a specific vehicle component can be represented by the weight of the edge. This enables the vehicle fault diagnosis system to rapidly assess the probability of a fault of an associated vehicle component upon the detection of an abnormal signal. For example, in the event that the battery power signal is identified as abnormal, the vehicle fault diagnosis system can be capable of determining that there is a 50% probability of a fault in the battery, based on the weight of 0.5 for edge E11. The weight assignment approach of this disclosure not only improves the accuracy of fault diagnosis, but also enhances the real-time response to the vehicle status of the vehicle fault diagnosis system. Moreover, the knowledge graph of this disclosure can be optimized through the application of a machine learning algorithm. The weight of the edge can be modified on an ongoing basis in response to new data, allowing the system to adapt to the vehicle's operation in different environments. This enhances the accuracy of fault diagnosis and the reliability of the vehicle fault diagnosis system.

As discussed above, for one faulty component, there may be multiple abnormal signal nodes associated, which may occur simultaneously or interact with each other. Therefore, if a plurality of abnormal signal nodes are identified simultaneously, then there is a greater probability that the same faulty component node, to which those abnormal signal nodes being associated, is faulty. The probability or possibility of a fault of that same vehicle component can be indicated by summing a plurality of probabilities, each corresponding to a respective one of the plurality of abnormal signals each indicating a fault of that same vehicle component. For example, the battery system of a vehicle may contain a plurality of monitoring signals, such as a power, a voltage, a temperature, and the like. If one of those monitoring signals is abnormal, the vehicle fault diagnosis system can determine it as a minor fault or a normal fluctuation. However, if both the power and voltage monitoring points are abnormal at the same time, the vehicle fault diagnosis system can determine the possibility of a battery fault to be greatly increased. In this case, the vehicle fault diagnosis system can calculate a comprehensive abnormality index of those two signals, for example, by adding up the abnormality probabilities of the two signals, so as to obtain a more accurate fault prediction. In the above example, if both an abnormal battery charge signal and an abnormal battery voltage signal are present, the probability of the battery faulty is 50%+10%=60%. The edge weight-based analysis approach disclosed in this disclosure utilizes the correlation between signal nodes to improve the accuracy and reliability of fault detection by integrating the anomalies of a plurality of signal nodes.

The approach of assigning values to the edges between nodes in the knowledge graph and performing fault diagnosis based on the assigned values, as disclosed in this disclosure, can be applied to other sub-systems of the vehicle, including the power system, the braking system, the steering system, and so forth. By constructing a signal node network for each system and analyzing the interactions between the nodes, a comprehensive monitoring of the entire vehicle status can be achieved. In the event that a plurality of signal nodes from a plurality of sub-systems are identified as abnormal simultaneously, the fault diagnosis system is capable of rapidly locating the potential source of the fault and predicting the trajectory of its development.

Figure 3:
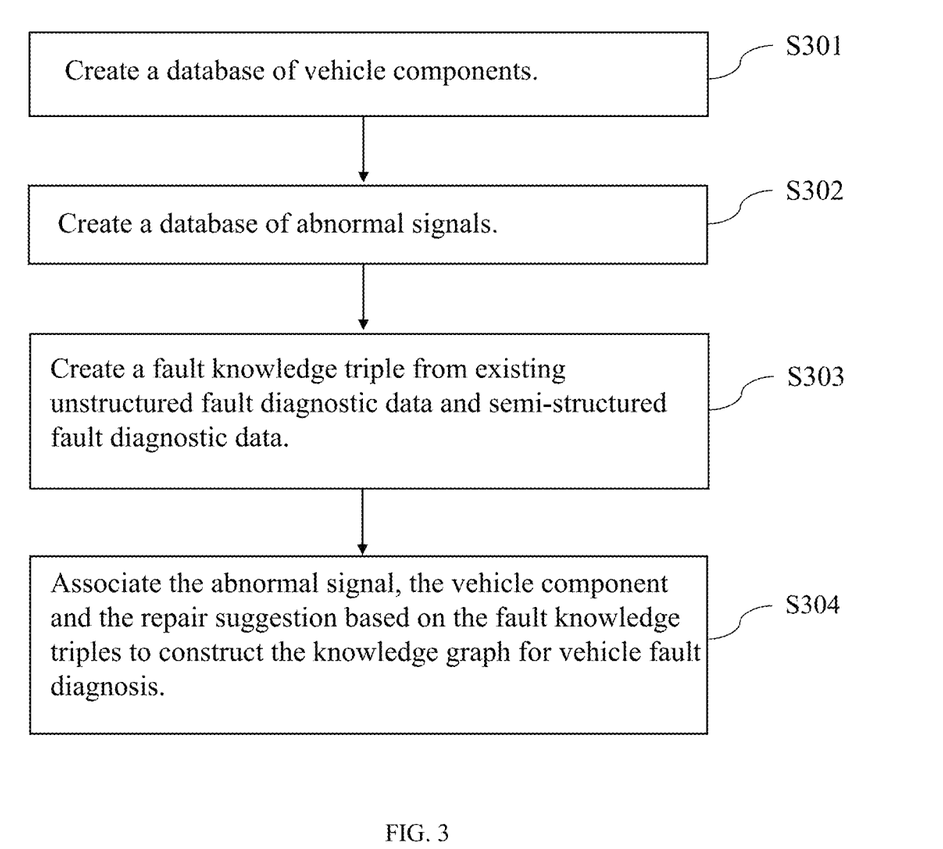
FIG. 3 is a flowchart of a method for constructing a knowledge graph for vehicle fault diagnosis according to an embodiment of this disclosure.

FIG. 3 illustrates a flowchart of a method for constructing a knowledge graph for vehicle fault diagnosis according to an embodiment of this disclosure. In some embodiments, the method can comprise steps S301-S304. In step S301, a database of vehicle components can be constructed. As defined in this disclosure, a "vehicle components" refers to a fundamental unit that can be replaced or repaired individually during the course of vehicle repair and repair. The term "vehicle component" is not synonymous with a sub-system of a vehicle, such as an "air conditioning subsystem".

Rather, it refers to a specific component, such as an air outlet temperature sensor, a cooling fan, a cooling fan controller, a compressor, and others, that collectively constitute the air conditioning subsystem. Examples of a "vehicle component" can include not only common components such as a battery, a brake pad and a water temperature sensor, but also a piston, a connecting rod, a crankshaft, a valve, and the like, which are found within an engine. The creation of the knowledge graph of this disclosure is based on the definition of a "vehicle component" as a basic unit in repair and repair. This approach allows for more accurate identification and localization of faults, thereby enhancing repair efficiency and vehicle reliability.

In step S302, a database of abnormal signals can be created. The database of abnormal signals can serve as a comprehensive repository of information, containing various vehicle fault indicators. The aforementioned abnormal signals are not limited to the fundamental operational modes and states of the vehicle; they also include signals collected from various sensors, as well as the vehicle's driving data. In some instances, the abnormal signals can comprise vehicle information pertinent to vehicle faults. These signals typically originate from a plurality of monitoring points within the vehicle and include, but are not limited to, data regarding the vehicle's operational mode, current state, sensor data, and real-time driving information. The mode of operation of the vehicle can include not only a driving mode, but also a switching state between automatic driving and manual driving. The current state of the vehicle can be defined as a set of conditions that are in a state of flux, comprising such actions as starting, accelerating, changing lanes, decelerating, braking, and stopping. The sensor signals can be a direct reflection of the vehicle's health, providing key indicators such as a battery temperature, a battery charge level, an interior temperature, an exterior temperature, an oil pressure, a tire pressure, and more. The driving information can include the vehicle's speed, acceleration, mileage, and potentially environmental factors such as road and weather conditions.

In step S303, valuable fault knowledge, such as fault knowledge triples, can be extracted from existing unstructured fault diagnostic data and semi-structured fault diagnostic data. In some instances, the fault knowledge triple can comprise: <abnormal signal-fault name-faulty component> and <faulty component-repair method-repair suggestion>. The unstructured fault diagnostic data and semi-structured fault diagnostic data can be derived from vehicle sensors, repair records, or driver feedback. The extraction of knowledge triples can facilitate the construction of a fault diagnosis model that is more intuitive and accessible. For example, an abnormal signal can indicate a specific fault name, which in turn can be linked to a specific vehicle component. Similarly, for each faulty vehicle component, the system can provide appropriate repair methods and recommendations, which facilitate the rapid identification of the source of the problem and offer effective repair solutions. In this manner, the fault knowledge triple not only serves to optimize the fault detection process, but also enhances the efficiency and accuracy of the repair work.

In some instances, the unstructured fault diagnostic data can be a media-rich fault case. A media-rich fault case can include a description of faulty symptoms and the repair methods employed to address them, an image of a location of the faulty component, a troubleshooting repair video, and any combination thereof. A semi-structured fault diagnostic data can be vehicle repair order data. As an example of unstructured data, the media-rich fault case can furnish the technicians with multi-dimensional, thereby facilitating the rapid identification of the source of the problem. For instance, a comprehensive description of the faulty symptoms can assist in comprehending the nature of the problem, whereas images of the faulty components can serve to visually indicate the location of the problem. Moreover, repair videos serve not only to illustrate the precise steps for troubleshooting but also to convey supplementary information in the form of notes and tips pertaining to the repair process. Such media-rich contents can be employed alone or in combination with other data types, including semi-structured vehicle repair order data. The latter records pertinent information regarding fault handling, including fault codes, repair history, and component replacement records, in a standardized format. The combination of these approaches offers a more comprehensive view of the troubleshooting process, thereby enhancing the accessibility and value of the troubleshooting data.

In some instances, the "fault name" can be derived from the name of the media-rich fault case or an initial fault diagnosis within the vehicle repair order. For example, one or more vehicle parts that are repaired or replaced as outlined in the media-rich fault case or the vehicle repair order can be identified as the "faulty vehicle component". The vehicle sensor signal information that is described in the media-rich fault case or the vehicle repair order can be identified as the "abnormal signal". Consequently, a fault knowledge triple <abnormal signal-fault name-faulty vehicle component> can be constructed. Similarly, a fault knowledge triple <faulty vehicle component-repair method-repair suggestion> can be constructed. For example, if a vehicle repair order indicates that "replacing the brake pads" is a solution to a brake system fault, then this solution can be extracted and associated with the faulty vehicle component "brake pad" and the corresponding repair suggestion, thus forming a fault knowledge triple. The number of instances of each fault knowledge triple can be updated and recorded, thus allowing the frequency or number of occurrences of each fault knowledge triple to be obtained.

The triples can be used to train a machine learning model, thereby enabling the model to forecast prospective failures and suggest appropriate repair strategies. In some instances, the analysis of a large amount of vehicle repair order data can enable the machine learning model to identify the relationships between faults and repair outcomes, thus facilitating the formulation of more precise repair recommendations.

This not only enhances the efficacy of repair operations but also facilitates a prevention of potential failures in a timely manner, thereby ensuring the safety of vehicles. The construction of fault knowledge graph is not limited to the extraction of triples; it also encompasses the identification and interlinking of relationships between triples. For example, if multiple vehicle repair orders indicate that cleaning the brake disc is typically advised following the replacement of brake pads, this correlation can be identified as an association relationship between two triples. By establishing such correlations, the knowledge graph can facilitate a more dynamic and comprehensive representation of repair-related knowledge and experience. Moreover, repair methodologies and recommendations may evolve over time. Consequently, the knowledge graph must be updated on a regular basis to reflect the latest repair techniques and standards.

In step S304, the fault knowledge triple created in step S303 can be utilized to associate the abnormal signal, faulty vehicle component and repair suggestion, thereby forming a knowledge graph for vehicle fault diagnosis. The created knowledge graph can comprise an abnormal signal node, a faulty component node and a repair suggestion node. The abnormal signal node can be linked to one or more faulty component nodes that can generate the abnormal signal. The faulty component node can be linked to one or more repair suggestion nodes that can repair the faulty component.

In the knowledge graph of this disclosure, the relationship between an abnormal signal i and a vehicle component k can be quantified by a weight $E_{i/k}$ for an edge. This weight can be interpreted as the probability $P_{i/k}$ of fault of the component k when the abnormal signal i is present. This approach enables the system to rapidly evaluate the likelihood of a fault in the relevant component when a specific abnormal signal is identified. The probability can be calculated using a statistical approach, as in Formula I:

$$P_{i/k} = C(i,k)/C(i) \qquad \text{Formula I}$$

where C(i, k) is the number of times the abnormal signal i and the vehicle component k occur simultaneously in a same fault, and C(i) is the number of times the abnormal signal i occurs in all faults. In this way, a quantitative fault risk assessment based on historical data can be obtained.

The aforementioned quantization approach, as disclosed in this disclosure, offers a scalable solution for weight $E_{i/k}$ of the edge between the abnormal signal i and the vehicle component k. As more data is accumulated and analyzed, the knowledge graph can be continuously updated and optimized, thereby enhancing the precision of fault diagnosis. For example, the probability calculation can be refined by incorporating additional parameters or utilizing more sophisticated statistical models. Moreover, this approach can be extended to other subsystems and components of the vehicle, thus facilitating comprehensive vehicle health management.

An edge between the faulty component node and the repair suggestion node can also be assigned a value. In some instances, if a faulty component node is associated with only one repair suggestion node, the edge between the faulty component node and the associated repair suggestion node can be assigned a value of 1. In some instances, if a faulty component node is associated with a plurality of repair suggestion nodes, a probability value based on previous statistics can be assigned to each of the plurality of edges between the faulty component node and the associated repair suggestion nodes. In some instances, if a faulty component node is associated with a plurality of repair suggestion nodes, the plurality of edges between the faulty component node and the associated plurality of repair suggestion nodes can each be assigned values based on a quality of the repair suggestion. For example, if a repair suggestion includes multi-dimensional explanations such as images, videos, and text, then the repair suggestion can be considered to be of a higher quality, and thus a higher value (for example, 0.8) can be assigned to the edge between the faulty component node and the repair suggestion node. If a repair suggestion includes only images and text, then the repair suggestion can be considered to be of a lower quality, and thus a lower value (for example, 0.3) can be assigned to the edge between the faulty component node and the repair suggestion node.

Figure 4:
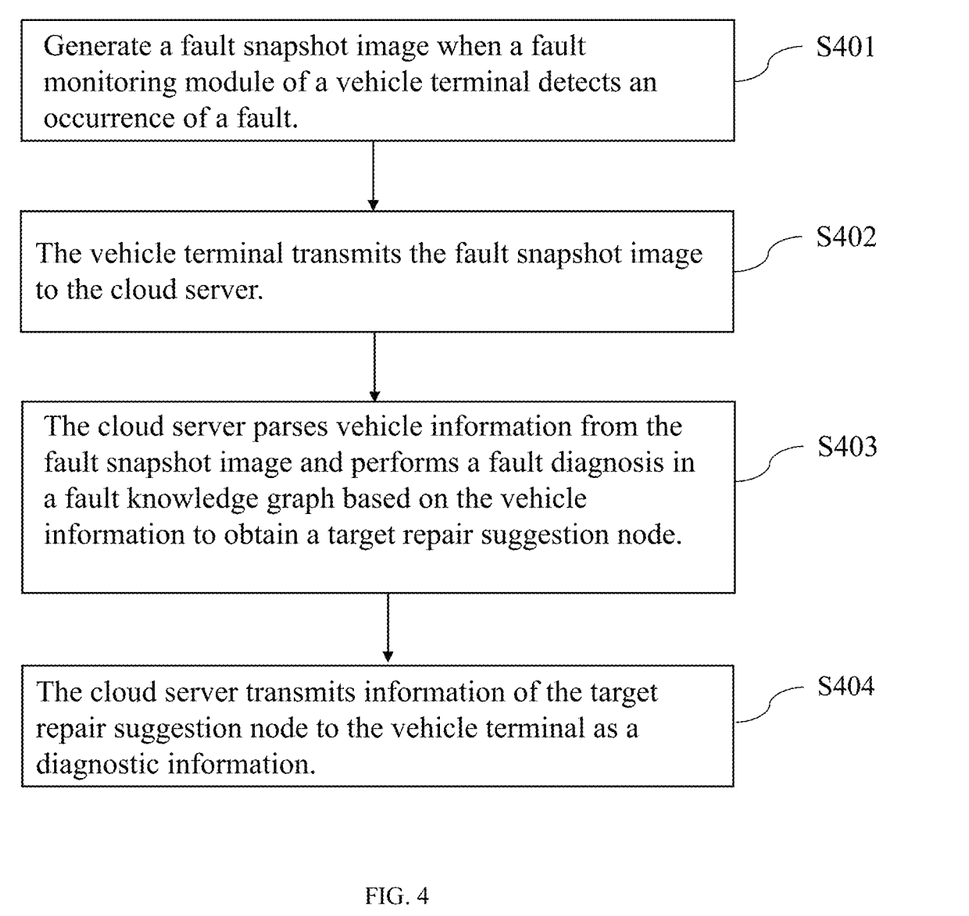
FIG. 4 is a flowchart of a method for diagnosing vehicle faults using a knowledge graph according to an embodiment of this disclosure.

FIG. 4 illustrates a flowchart illustrating a method for diagnosing vehicle faults using a knowledge graph according to an embodiment of this disclosure. The knowledge graph employed in the diagnostic method for vehicle faults of this disclosure can be a knowledge graph for diagnosing vehicle faults constructed using the method disclosed in this disclosure. In some embodiments, the method for diagnosing vehicle faults using a knowledge graph can comprise steps S401-S404.

In step S401, a fault snapshot image can be generated when a fault monitoring module of a vehicle terminal detects an occurrence of a fault. Detecting an occurrence of a fault can comprise the vehicle terminal detecting a fault signal (e.g., a fault code) or an indicator signal (e.g., a low battery indicator is on). Detecting of an occurrence of a fault can also comprise a fault indication such as a vehicle intelligence system reporting "cannot start the car". In some instances, the vehicle terminal can collect information via the CAN network, and the fault monitoring module can collect and summarize the collected information to generate a fault snapshot image. In step S402, the vehicle terminal can transmit the fault snapshot image to the cloud server.

In step S403, the cloud server can parse a vehicle information from the fault snapshot image and perform a fault diagnosis in a fault knowledge graph stored at the cloud server based on the vehicle information to obtain a target repair suggestion node.

In some instances, parsing the vehicle information can comprise the cloud server extracting from the fault snapshot image the vehicle information associated with the fault. The vehicle information can comprise a time of fault occurrence, a vehicle driving mode, a vehicle status, a vehicle sensor data, a vehicle driving data or any combination thereof. The vehicle driving mode can comprise an automatic driving mode, an assisted driving mode and a manual driving mode. The vehicle status can comprise a vehicle starting, a vehicle accelerating, a vehicle changing lanes, a vehicle decelerating, a vehicle braking and a vehicle standing still. The vehicle sensor data can comprise data collected with various components or sensors onboard the vehicle, including but not limited to a battery temperature, a battery power, a coolant temperature, a cabin temperature, and the like. The vehicle driving data can comprise a vehicle instantaneous speed, a vehicle average speed, a vehicle acceleration, and the like. In step S404, the cloud server can transmit information of the target repair suggestion node to the vehicle terminal as a diagnostic information.

The knowledge graph-based fault diagnosis performed by the cloud server can be a progressive fault diagnosis. In some embodiments, the progressive fault diagnosis performed by the cloud server can comprise: (i) identifying an abnormal signal from the vehicle information; (ii) locating in the knowledge graph the abnormal signal node corresponding to the abnormal signal; (iii) determining one or more faulty component nodes associated with the abnormal signal node as candidate faulty component node(s); (iv) obtaining one or more repair suggestion nodes associated with the candidate faulty component node(s); (v) determining a target repair suggestion node; and (vi) transmitting the target repair suggestion node as the diagnostic information to the vehicle terminal.

In some instances, identifying an abnormal signal from the vehicle information can comprise: the cloud server extracting from the fault snapshot image the vehicle information associated with the fault. In some instances, the vehicle information can comprise a time of the fault, a vehicle driving mode, a vehicle status, a vehicle sensor data, a vehicle driving data or any combination thereof. In some instances, after parsing from the fault snapshot image the vehicle information such as the time of the fault, the vehicle driving mode, the vehicle status, the vehicle signal, the vehicle driving data, and the like, the vehicle information can be compared with a normal value or a normal value range. When one or more vehicle information exceeds the normal value range, the vehicle information that exceeds the normal data can be identified as an abnormal signal. In some instances, vehicle information having a rate of change exceeding a preset threshold can be identified as an abnormal signal.

In a non-limiting example, if an "engine temperature value", which is indicated by an "engine temperature signal" parsed from the fault snapshot image, is higher than a preset threshold, then the "engine temperature signal" can be identified as an abnormal signal. Subsequently, an abnormal signal node "engine temperature signal node" corresponding to the abnormal signal "engine temperature signal" can be located in the knowledge graph, and the faulty component nodes associated with the abnormal signal node "engine temperature signal node", including but not limited to a temperature sensor node, a water pump node, a radiator node and a coolant tank node, can be determined as candidate faulty component nodes. Then, the repair suggestion nodes associated with the temperature sensor node, the water pump node, the radiator node and the coolant tank node can be obtained, including but not limited to "checking the temperature sensor node", "checking the water pump node", "checking the radiator node" and "checking the coolant node".

In some instances, performing a fault diagnosis in a fault knowledge graph at the cloud server to obtain a target repair suggestion node can comprise determining a faulty component node having the highest probability of fault from among a plurality of the faulty component nodes as the target faulty component node, and determining a repair suggestion node associated with the target faulty component node as the target repair suggestion node. The probability of fault $P_k$ of each faulty component node is calculated by Formula II:

$$P_k = \sum_i P_{i/k} \qquad \text{Formula II}$$

where $P_{i/k}=C(i, k)/C(i)$, $C(i, k)$ is the number of times the abnormal signal i and the vehicle component k occur simultaneously in a same fault, and $C(i)$ is the number of times the abnormal signal i occurs in all faults. The approach of calculating the probability of fault $P_k$ of a faulty component node effectively utilizes statistical data from past faults to predict the faulty component.

In some instances, a machine learning model (e.g., a convolutional neural network model (CNN)) can be utilized to extract the fault feature vector from the fault snapshot and extract the feature vector from the repair suggestion node. A vector-matching can be performed to determine the most accurate target repair suggestion node. In some instances, among the one or more repair suggestion nodes, the repair suggestion node having the highest degree of vector-matching with the fault feature vector can be determined as the target repair suggestion node. In some instances, among the one or more repair suggestion nodes, one or more repair suggestion nodes having a degree of vector-matching with the fault feature vector exceeding a preset value can be determined as the target repair suggestion node(s). In some instances, vector-matching can be implemented using a similarity matching algorithm. The matching process can be performed based on various criteria, such as Euclidean distance or cosine similarity, to determine, from among one or more repair suggestion nodes, the repair suggestion node having the highest degree of vector-matching with the fault feature vector. In this way, when a new fault is detected by the vehicle terminal, the machine learning model can quickly provide accurate repair suggestions, significantly reducing a diagnosis time and improving a repair efficiency and an equipment reliability. In addition, over time, the matching process can be continuously optimized to obtain more accurate repair suggestions by continuously learning new fault cases, thereby realizing an intelligent repair recommendation.

Figure 5:
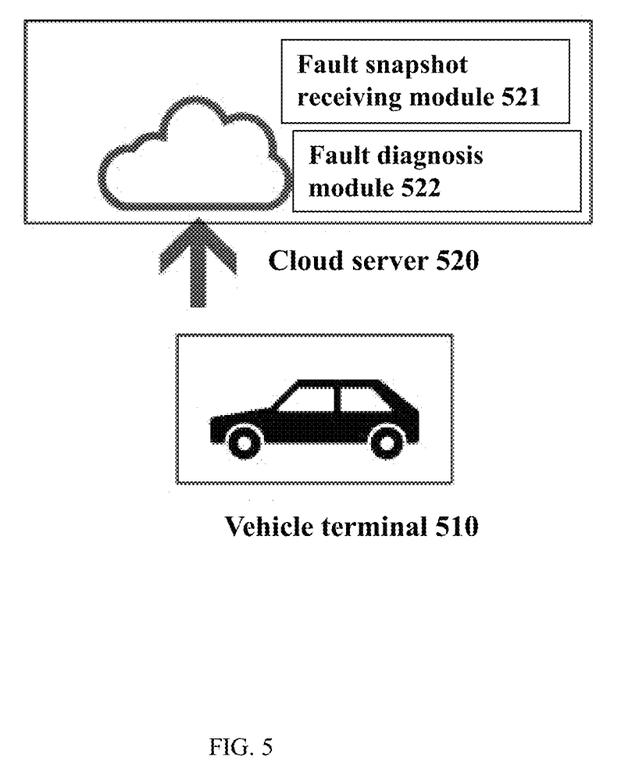
FIG. 5 is a block diagram of a system for diagnosing vehicle faults according to an embodiment of this disclosure.

FIG. 5 is a block diagram of a system for diagnosing vehicle faults according to an embodiment of the present disclosure. In some embodiments, the system for diagnosing vehicle faults using a knowledge graph of the present disclosure can include a vehicle terminal 510 and a cloud server 520. The vehicle terminal 510 can comprise a fault monitoring module and a fault transmitting module. The fault monitoring module can be configured to generate a fault snapshot image when a vehicle fault is detected. The fault transmitting module can be configured to transmit the fault snapshot image to the cloud server 520.

The cloud server 520 of the present disclosure can comprise a fault knowledge graph (not shown), a fault snapshot receiving module 521 and a fault diagnosis module 522. In some embodiments, the fault knowledge graph can comprise an abnormal signal node, a faulty component node and a repair suggestion node. The abnormal signal node can each be associated with one or more faulty component nodes that account for a generation of the vehicle fault. The faulty component node can each be associated with one or more repair suggestion nodes that provide repair suggestions for the faulty component.

In some embodiments, the fault snapshot receiving module 521 can be configured to receive the fault snapshot image from the vehicle terminal. The fault diagnosis module 522 can be configured to parse the vehicle information from the fault snapshot image, perform a progressive fault diagnosis in the fault knowledge graph based on the vehicle information to obtain a target repair suggestion node, and transmit information of the target repair suggestion node as diagnostic information to the vehicle terminal. In some embodiments, the fault diagnosis module 522 can be further configured to extract, from the fault snapshot image, the vehicle information associated with the vehicle fault. The vehicle information can include an occurrence time of the fault, a vehicle driving mode, a vehicle status, a vehicle sensor data, a vehicle driving data or any combination thereof.

In some embodiments, the fault diagnosis module 522 can be further configured to: (i) identify an abnormal signal from the vehicle information; (ii) locate in the knowledge graph the abnormal signal node corresponding to the abnormal signal; (iii) determine one or more faulty component nodes associated with the abnormal signal node as candidate faulty component node(s); (iv) obtain one or more repair suggestion nodes associated with the candidate faulty component node(s); (v) determining a target repair suggestion node; and (vi) transmit the target repair suggestion node as the diagnostic information to the vehicle terminal.

In some instances, the processing (v) of the fault diagnosis module 522 can comprise determining a faulty component node having the highest probability of fault from among a plurality of the faulty component nodes as the target faulty component node, and determining a repair suggestion node associated with the target faulty component node as the target repair suggestion node. The probability of fault $P_k$ of each faulty component node is calculated by Formula II:

$$P_k = \sum_i P_{i/k} \qquad \text{Formula II}$$

where $P_{i/k}=C(i, k)/C(i)$, $C(i, k)$ is the number of times the abnormal signal i and the vehicle component k occur simultaneously in a same fault, and $C(i)$ is the number of times the abnormal signal i occurs in all faults. The approach of calculating the probability of fault $P_k$ of a faulty component node effectively utilizes statistical data from past faults to predict the faulty component.

In some instances, the processing (v) of the fault diagnosis module 522 can comprise a vector-matching. The vector-matching can comprise: extracting the one or more feature vectors from the one or more repair suggestion nodes using a convolutional neural network model, and extracting the fault feature vector from the fault snapshot using the convolutional neural network model. In an example, from among the one or more repair suggestion nodes, the repair suggestion node having the highest degree of vector-matching with the fault feature vector can be determined as the target repair suggestion node. In an example, from among the one or more repair suggestion nodes, one or more repair suggestion nodes having a degree of vector matching with the fault feature vector that exceeds a preset value can be determined as the target repair suggestion nodes The present disclosure also provides a system including one or more computer processors and a computer readable memory. The computer readable memory can include machine executable code, which implements the method for constructing a knowledge graph for vehicle fault diagnosis or the method for diagnosing vehicle faults using a knowledge graph of the present disclosure when executed by the one or more computer processors.

While preferred embodiments of the present invention have been shown and described herein, it will be obvious to those skilled in the art that such embodiments are provided by way of example only. Numerous variations, changes, and substitutions will occur to those skilled in the art without departing from the invention.

What is claimed is:

1. A method for constructing a knowledge graph for vehicle fault diagnosis, the method comprising:
   creating a database of vehicle components, the vehicle components comprising fundamental units that are capable of being replaced or repaired;
   creating a database of abnormal signals, the abnormal signals comprising vehicle information related to vehicle faults, the vehicle information related to vehicle faults comprising a vehicle operation mode, a vehicle state, a sensor signal and a driving data;
   creating a fault knowledge triple from existing unstructured fault diagnostic data and semi-structured fault diagnostic data, the fault knowledge triple comprising <abnormal signal-fault name-faulty component> and <faulty component-repair method-repair suggestion>; and
   associating the abnormal signal, the vehicle component and the repair suggestion based on the fault knowledge triples to construct the knowledge graph for vehicle fault diagnosis, wherein a probability $P_{i/k}$ that an abnormal signal i indicates that a vehicle component k is faulty is used as a weight $E_{i/k}$ for an edge between a node corresponding to the abnormal signal i and a node corresponding to the vehicle component k in the knowledge graph,
   wherein the probability $P_{i/k}$ is calculated using Formula I:

$$P_{i/k} = C(i, k)/C(i) \qquad \text{Formula I}$$

wherein, C(i, k) is the number of times the abnormal signal i and the vehicle component k occur simultaneously in a same fault, and C(i) is the number of times the abnormal signal i occurs in all faults.

2. The method of claim 1, wherein the knowledge graph comprises an abnormal signal node, a faulty component node and a repair suggestion node, wherein the abnormal signal node is associated with one or more faulty component nodes that are related to a generation of the abnormal signal, and wherein the faulty component node is associated with one or more repair suggestion nodes that provide repair suggestions for the faulty component node.

3. The method of claim 2, further comprising summing a plurality of probabilities, each corresponding to a respective one of a plurality of abnormal signals associated with the vehicle component k, to obtain a probability of fault for the vehicle component.

4. The method of claim 1, further comprising updating the weight $E_{i/k}$ using new data through a machine learning algorithm.

5. The method of claim 1, further comprising training a machine learning model using the fault knowledge triple, thereby enabling the machine learning to predict future faults and recommend repair measures.

6. The method of claim 1, further comprising recognizing an association between a plurality of the fault knowledge triples, thereby interlinking the plurality of the fault knowledge triples.

7. A system comprising one or more computer processors and a computer-readable memory, wherein the computer readable memory comprising machine executable code that, upon execution by the one or more computer processors, implements the method for constructing a knowledge graph for vehicle fault diagnosis of claim 1.

8. A method for diagnosing vehicle faults using a knowledge graph, the method comprising:
   (a) generating a fault snapshot image when a fault monitoring module of a vehicle terminal detects a vehicle fault;
   (b) transmitting the fault snapshot image from the vehicle terminal to a cloud server;
   (c) parsing a vehicle information at the cloud server from the fault snapshot image, and performing a fault diagnosis in a fault knowledge graph stored at the cloud server based on the vehicle information to determine a target repair suggestion node; and
   (d) transmitting from the cloud server an information of the target repair suggestion node as a diagnostic information to the vehicle terminal,
   wherein the fault knowledge graph comprises abnormal signal nodes, faulty component nodes and repair suggestion nodes,
   wherein the abnormal signal nodes are each associated with one or more faulty component nodes that are related to a generation of the vehicle fault,
   wherein the faulty component nodes are each associated with one or more repair suggestion nodes that provide repair suggestions for the faulty component node, and
   wherein determining the target repair suggestion node comprises determining a faulty component node having the highest probability of fault from among a plurality of the faulty component nodes as a target faulty component node and determining a repair suggestion node associated with the target faulty component node as the target repair suggestion node,
   wherein the probability of fault $P_k$ of each faulty component node is calculated by Formula II:

$$P_k = \sum_i P_{i/k} \qquad \text{Formula II}$$

wherein, $P_{i/k}$=C(i, k)/C(i), and
   wherein, C(i, k) is the number of times the abnormal signal i and the vehicle component k occur simultaneously in a same fault, and C(i) is the number of times the abnormal signal i occurs in all faults.

9. A system for diagnosing vehicle faults using a knowledge graph, the system comprising:
   a vehicle terminal; and
   a cloud server,
   wherein the vehicle terminal comprises:
      a fault monitoring module configured to generate a fault snapshot image in the event of a vehicle fault; and
      a fault transmitting module configured to transmit the fault snapshot image to the cloud server,
   wherein the cloud server comprises:
      a fault knowledge graph;
      a fault snapshot receiving module; and
      a fault diagnosis module,
   wherein the fault knowledge graph comprises abnormal signal nodes, faulty component nodes and repair suggestion nodes, the abnormal signal nodes being each associated with one or more faulty component nodes that generate the abnormal signal, the faulty component nodes being each associated with one or more repair suggestion nodes that provide repair suggestions for the faulty component node, wherein the fault snapshot receiving module is configured to receive the fault snapshot image from the vehicle terminal, wherein the fault diagnosis module is configured to parse a vehicle information from the fault snapshot image, perform a fault diagnosis in the fault knowledge graph based on the vehicle information to obtain a target repair suggestion node, and transmit an information of the target repair suggestion node as a diagnostic information to the vehicle terminal, and wherein determining the target repair suggestion node comprises determining a faulty component node having the highest probability of fault from among a plurality of the faulty component nodes as a target faulty component node and determining a repair suggestion node associated with the target faulty component node as the target repair suggestion node, wherein the probability of fault $P_k$ of each faulty component node is calculated by Formula II:

$$P_k = \sum_i P_{i/k} \qquad \text{Formula II}$$

wherein, $P_{i/k}=C(i, k)/C(i)$, and wherein, $C(i, k)$ is the number of times the abnormal signal i and the vehicle component k occur simultaneously in a same fault, and $C(i)$ is the number of times the abnormal signal i occurs in all faults.

* * * * *